United States Patent [19]

Eriksson et al.

[11] Patent Number: 5,356,610
[45] Date of Patent: Oct. 18, 1994

[54] METHOD FOR REMOVING IMPURITIES FROM AN ALKALI METAL CHLORATE PROCESS

[75] Inventors: Stina Eriksson, Stöde; Ulla-Kari Holmström, Sundsvall, both of Sweden

[73] Assignee: Eka Nobel AB, Bohus, Sweden

[21] Appl. No.: 57,558

[22] Filed: May 6, 1993

[30] Foreign Application Priority Data

Mar. 9, 1993 [SE] Sweden .............. 9300780-5

[51] Int. Cl.$^5$ ............................. C01B 11/14
[52] U.S. Cl. .................... 423/475; 423/165; 423/92; 210/687
[58] Field of Search ............. 423/475, 165, 92; 210/687

[56] References Cited

U.S. PATENT DOCUMENTS

| | | | |
|---|---|---|---|
| 4,155,820 | 5/1979 | Ogawa et al. | 423/165 |
| 4,946,565 | 8/1990 | Hakansson | 204/95 |
| 5,176,801 | 1/1993 | Szanto et al. | 204/86 |

FOREIGN PATENT DOCUMENTS 0947010  5/1974  Canada .................. 423/165

Primary Examiner—Benjamin R. Fuller
Assistant Examiner—Valerie Ann Lund
Attorney, Agent, or Firm—Burns, Doane, Swecker & Mathis

[57] ABSTRACT

The invention relates to a method for removing calcium ions and silicon compounds from various liquors produced or obtained in an alkali metal chlorate process, thereby reducing the operating cost and improving the possibility to close the process further. The calcium ions and silicon compounds are removed by addition of carbonate ions for precipitating calcium carbonate and by addition of an iron-containing compound for forming and precipitating a complex of iron ions and a silicon compound, whereupon the precipitates are co-separated from the liquor. The removal of calcium and silicate ions is substantially facilitated by the simultaneous separation of the precipitates. Subsequently, the excess of carbonate ions can be reduced by acidifying the electrolyte for releasing carbon dioxide.

15 Claims, No Drawings

METHOD FOR REMOVING IMPURITIES FROM AN ALKALI METAL CHLORATE PROCESS

The invention relates to a method for removing calcium ions and silicon compounds from various liquors produced or obtained in an alkali metal chlorate process, thereby reducing the operating cost and improving the possibility to close the process further. The calcium ions and silicon compounds are removed by addition of carbonate ions for precipitating calcium carbonate and by addition of an iron-containing compound for forming and precipitating a complex of iron ions and a silicon compound, whereupon the precipitates are co-separated from the liquor.

BACKGROUND

Alkali metal chlorate, and particularly sodium chlorate, is an important chemical in the cellulose industry, where it is used as a raw material in the production of chlorine dioxide for bleaching of cellulose fibres. Alkali metal chlorate is produced by electrolysis of an electrolyte containing alkali metal chloride according to the overall formula:

$$MeCl + 3H_2O \rightarrow MeClO_3 + 3H_2 \; (Me = \text{alkali metal})$$

The process is cyclic, where in a first step the chloride electrolyte is brought to an electrolyser for the formation of hypochlorite, whereupon the solution is brought further to reaction vessels for further reaction to chlorate. Subsequently, chlorate formed is separated by crystallization.

The content of impurities must be low in an electrolyte containing chlorate and chloride ions, if the electrolysis carried out in a chlorate cell shall be energy efficient. Thus, calcium, magnesium and fluoride ions and silicon compounds cause depositions on the cathodes and thereby a higher operating voltage and energy cost. Sulphates and silicon compounds are also known to damage the anodes, thereby increasing the operating voltage and/or decreasing the lifetime.

Calcium ions present in technical salt or raw water from which a chloride brine is prepared, are commonly removed by alkalization at which calcium hydroxide precipitates. Other techniques for purifying chloride brines from calcium ions include precipitation with e.g. carbonate an/or ion exchange with cationic resins. Calcium ions are, however, normally also introduced later in the process. e.g. as impurities in the process water and auxiliary chemicals used. Calcium ions can also be added deliberately, e.g. for removing sulphate ions by precipitating calcium sulphate. Therefore, it is normally necessary to remove calcium ions also from the chlorate electrolyte. Commonly, a portion of the electrolyte is recycled to the brine purifying system.

U.S. Pat. No. 4,946,565 discloses a process for removal of impurities of silicon by precipitation with iron ions. The iron ions can be added either to a chlorate electrolyte or to a brine of alkali metal chloride from which the chlorate electrolyte is produced. When iron silicates are removed separately the resulting precipitate is difficult to filter, thereby necessitating separation by sedimentation. Accordingly, the reduction in silicon content will be limited.

Thus, various methods have been proposed to keep the concentration of calcium ions and silicon compounds in the chlorate process at an acceptable level. Common to the precipitating techniques is a high investment cost for the very fine filters required, low flexibility due to combined purification of brine and electrolyte and/or poor efficiency due to separate removal of the precipitates. The object of the present invention is to provide an efficient and flexible process to remove both calcium ions and silicon compounds from chlorate electrolytes, at a reasonably low investment cost.

THE INVENTION

The invention relates to a method for purifying various liquors produced or obtained in an alkali metal chlorate process, where substantial ion-exchange capacity and advanced filters can be replaced by precipitation and co-separation of chemical compounds. The method comprises adding carbonate ions and an iron-containing compound to the liquor for precipitating calcium carbonate and forming and precipitating a complex of iron ions and a silicon compound, and subsequently co-separating the precipitates from the thus purified liquor.

Thus, the invention concerns a method for removing calcium ions and silicon compounds from an alkali metal chlorate process as disclosed in the claims. The advantage of the present method is besides the comparatively low investment and energy costs, also the large flexibility as regards the amount of calcium and silicon that can be removed from the chlorate process.

The co-separation step of the present method is cost-saving and, contrary to what could be expected, improves the separation effect. This is due to the interaction between the precipitates of calcium carbonate and complex of iron ions and a silicon compound, which gives a co-precipitate with larger size and reduced tendency to clog the filters. This also makes it possible to separate e.g. calcium fluoride crystals, which are small and therefore normally difficult to remove from a liquor. Furthermore, a substantial portion of common impurities like heavy-metal ions, alkaline earth metals and the like, adhere to the precipitates obtained and are thereby easily separated from the liquor.

The present method is designed in such a way that commonly occurring impurities in the precipitation chemicals added can be removed efficiently, irrespective of the order of addition. Thus, silicon compounds as well as heavy-metal ions normally accompanying the carbonate ions and iron-containing compound, respectively, can be removed in the co-separation step.

The total content of multivalent cations can be reduced considerably with the present method. Therefore, if the purified liquor is subsequently fed to a cation-exchange resin, the requirement for ion-exchange capacity will be low and yet make possible a substantial reduction in the content of various cations.

The carbonate ions and iron-containing compound can be added to the liquor in arbitrary order. A considerable improvement in comparison with prior art techniques, is obtained when the iron-containing compound is first added and then the carbonate ions. However, the addition of carbonate ions before the iron-containing compound is preferred, since this gives an especially improved filtering efficiency.

With the present method it is possible to obtain a liquor with a very low content of calcium, even if the initial content is quite high. Thus, the present method is advantageously used with liquors where the content of calcium is up to about 10 g/l. The present method is suitably used with liquors where the content of calcium is up to 5 g/l, preferably up to 2 g/l.

The present method can be applied to various liquors produced or obtained in an aqueous alkali metal chlorate process. Thus, the liquors comprise electrolyte, brine, regeneration and conversion liquids from ion-exchange steps and other liquors in the chlorate process. The present method is suitably used to purify alkali metal chlorate electrolytes and preferably electrolytes where sulphate ions have been removed by precipitation with a calcium-containing compound, at which the concentration of calcium can be increased considerably.

The entire liquor, or a portion thereof, can be withdrawn from the chlorate process, purified according to the present method and returned to the process. The mode of operation can be continuous or batch-wise. A suitable liquor for batch-wise operation is a shut-down electrolyte.

Before addition of carbonate ions, the pH of the liquor should be alkaline to avoid losses of carbon dioxide. The pH in the precipitation and separation steps is important for the possibility to substantially remove calcium ions and iron-containing compounds from the liquor. Thus, in the precipitation of calcium carbonate and complex of iron ions and a silicon compound and in the subsequent co-separation step, the pH of the liquor should be alkaline, suitably in the range of from about 7.5 up to about 12 and preferably in the range of from 8 up to 11.

Irrespective of order of addition, i.e. whether the carbonate ions are added before or after the iron-containing compound, for economic reasons it is preferred that the pH prevailing after precipitation in the first step is maintained. It is especially preferred, to first add carbonate ions and then an iron-containing compound at approximately the same pH, whereupon the pH is adjusted for precipitating magnesium hydroxide and more calcium carbonate. For precipitating magnesium hydroxide, the pH of the liquor can be adjusted to within the range of from about 9.5 up to about 13.5 after precipitation of calcium carbonate and formation and precipitation of a complex of iron ions and a silicon compound. For precipitating magnesium hydroxide, the pH of the liquor is suitably adjusted to within the range of from 10.0 up to 12.5 and preferably from 10.3 up to 11.5. Suitably, the precipitates of calcium carbonate and a complex of iron ions and a silicon compound are co-separated, before the pH is adjusted for precipitating magnesium hydroxide.

The amount of carbonate ions added is dependent on the concentration of calcium ions and the desired carbonate excess after precipitation. Thus, the amount of carbonate ions added can be chosen to give an excess in the range of from about 0.1 up to 5 g/l, suitably from 0.2 up to 3 g/l and preferably from 0.3 up to 2 g/l.

The source of carbonate ions is not critical, but should be selected to avoid addition of impurities detrimental to the subsequent electrolysis. The source of carbonate ions can be a solution containing alkali metal carbonate, suitably sodium carbonate for economical reasons and for ease of production if sodium chlorate is produced. Furthermore, the source of carbonate ions can be a gas containing carbon dioxide, which upon addition to the alkaline liquor reacts to carbonate ions. Alkaline solutions containing carbonate can also be obtained by contacting such solutions with air containing carbon dioxide.

The present method can be integrated with the removal of chlorine-containing compounds from the hydrogen or reactor gas scrubbers of a chlorate plant. The alkaline scrubber liquor used, will contain dissolved carbon dioxide from air. The scrubber liquor containing formed carbonate ions is normally recycled to the chlorate process. The effect is often precipitation of various compounds in positions where they constitute a problem. By using the alkaline scrubber liquors in the present method the carbonate ions can be advantageously used, while at the same time the excess of carbonate ions is reduced.

The period of time from addition of carbonate to the co-separation as well as from addition of iron-containing compound to the co-separation, can be from about 5 min up to about 48 hours, suitably from 15 min up to 24 hours.

Silicon compounds commonly encountered in liquors produced or obtained in alkali metal chlorate processes, are $SiO_3^{2-}$ and $Si_xO_y^{z-}$.

With the present method it is possible to obtain a liquor with a very low content of silicon compounds, even if the initial content is quite high. Thus, the present method is advantageously used with liquors where the content of silicon compounds is up to about 100 mg/l calculated as Si. The present method is suitably used with liquors where the content of silicon compounds is up to 50 mg/l, preferably up to 30 mg/l calculated as Si.

The molar ratio between iron-containing compound added and silicon compounds in the liquor can be in the range of from about 1:1 up to about 20:1 calculated as Fe:Si. The molar ratio between iron-containing compound added and silicon compounds in the liquor lies suitably in the range of from 2:1 up to 10:1, preferably from 5:1 up to 8:1 calculated as Fe:Si.

After precipitation, an excess of iron-containing compound can be advantageously used. The remaining iron ions precipitate as hydroxides and facilitate removal of impurities like heavy-metal and alkaline earth metal ions and further separation of calcium carbonate. Also, an iron-containing compound can be added to the liquor to be purified, even where the content of silicon is very low. Thus, the excess of iron can be at least about 50 mg Fe/l of liquor, suitably at least 200 mg Fe/l.

The iron-containing compound comprises compounds with two or three valent iron ions or any mixture or sequence of addition thereof. Upon addition of an iron-containing compound, the iron ions form a complex with the silicon compound. Two valent iron ions are preferred, since they form a very strong insoluble complex, $Fe_2SiO_4$, with the silicon compounds. If possible, the anion of the iron-containing compound should be selected to be of use in the chlorate process and to avoid addition of impurities detrimental to the subsequent electrolysis. Therefore, $FeCl_2$ is a preferred compound. Iron metal can also be used, since rust (FeOOH) will be formed upon addition to the acid liquor.

The precipitated calcium carbonate and complex of iron ions and a silicon compound are separated from the liquor with any sufficiently efficient separation method, which can be selected and optimized by the artisan. However, it is advantageous to separate the precipitate from the remaining liquor by filtration, since this is an cost effective and efficient method. By carefully selecting and optimizing the filtering conditions, it is also possible to remove a substantial part of the calcium fluoride precipitated.

The co-separated calcium carbonate and complex of iron ions and a silicon compound, should be washed thoroughly and the wash liquor suitably recirculated to the respective precipitation steps. The wash liquor can be water, optionally purified, or various aqueous solutions containing a salt. e.g. NaCl, NaClO$_3$, CaCO$_3$, FeCl$_2$ or FeCl$_3$.

After co-separating the precipitates, suitably at least a portion of the purified liquor is ion exchanged for reducing the content of cationic impurities. In this way, the content of calcium ions can be reduced further. Cation exchange makes possible reduction also of other divalent cationic ions, such as magnesium, barium, strontium and copper, as well as other multivalent ions. The multivalent cationic impurities can be removed by passing a portion of the liquor through a slightly acidic cation exchange resin at a pH of about 10. The concentration of hypochlorite should be very low, preferably below about 0.05 g/l, to avoid chemical attack on the resin. Therefore, a stoichiometric amount of hydrogen peroxide is suitably added to the liquor before the cation exchange. The effect of the cation exchange is improved by lowering the temperature of the liquor. Therefore, the temperature is lowered to about 30° to 60° C., suitably 40° to 50° C., before the cation exchange. The cation exchange can be continuous or batch-wise.

The cation exchange resin needs to be regenerated and converted, when saturated with cations. This is commonly carried out by feeding a solution of hydrochloric acid followed by a solution of caustic. The resulting regenerating and conversion liquids thus obtained, are preferably treated according to the present method, separately or in a mixture, whereby the content of calcium and silicon as well as several heavy-metal and alkaline earth metal ions can be dramatically reduced. The liquids can be treated in a separate system, or brought to a system for purifying brine or electrolyte according to the present method.

After addition of carbonate ions and an iron-containing compound and co-separation of the precipitates, the liquor normally contains unprecipitated carbonate ions. If the liquor is a chlorate electrolyte, the carbonate ions will increase the consumption of acid and caustic in the process and carbon dioxide will be liberated in the electrolysis step and contaminate the hydrogen produced. Therefore, advantageously carbonate is converted to carbon dioxide before the electrolysis step. The pH at the conversion of carbonate to carbon dioxide can be up to about 6.5, suitably in the range of from 3 up to 6 and preferably in the range of from 4 up to 5.5. Subsequently, the electrolyte is stripped of carbon dioxide by a suitable combination of time, temperature, mixing and pressure, which is well known to the artisan. Introduction of a stripping gas is also possible.

The present method can be used in the production of alkali metal chlorates, suitably sodium or potassium chlorate and preferably sodium chlorate.

The invention and its advantages are illustrated in more detail by the following Example which, however, are only intended to illustrate the invention and not to limit the same. The percentages and parts used in the description, claims and example, refer to percentages by weight and parts by weight, unless otherwise specified.

EXAMPLE 1

250 liters of chlorate electrolyte containing 95 g NaCl/l and 560 g NaClO$_3$ was withdrawn from an electrochemical cell of a sodium chlorate producing plant. The initial content of sulphate ions was reduced from 15.3 g/l to 2.6 g/l by addition of calcium ions and subsequent filtration of precipitated calcium sulphate. At this, the content of calcium ions was raised from 40 mg/l to 750 mg/l after filtration. The pH of the electrolyte was regulated to 9 by addition of NaOH and the temperature regulated to 45° C. before addition of sodium carbonate. Carbonate ions were added to give an excess of 0.5 g/l after precipitation of calcium carbonate. While maintaining the pH and temperature, FeCl$_2$ was added at a molar ratio of 5:1 calculated as Fe:Si, after precipitation of calcium carbonate. At this, a complex of iron ions and a silicon compound precipitated. Subsequently, the precipitates were co-separated. The pH of the separated electrolyte was regulated to 10.5, at which magnesium hydroxide and more calcium carbonate precipitated. The precipitates were filtered-off. The carbonate excess after calcium precipitation was reduced by regulating the pH to 5.5, upon which carbon dioxide was released. The concentrations in mg/l and reduction after precipitation and double filtration in % are given in the following Table.

TABLE I

| Compound | After sulphate precip. | After co-separ. | After precipit. at pH 10.5 | Reduction after co-separ., % |
| --- | --- | --- | --- | --- |
| Ca | 750 | 0.9 | 0.2 | 99.9 |
| Si | 7 | <1 | <1 | >85.7 |
| Fe | 40 | <1.0 | <1.0 | >97.5 |
| Mg | 10 | 0.7 | <0.2 | 93 |

As is evident from the Table, the content of calcium, silicon, iron and magnesium can be reduced considerably by the present method. The content of calcium and magnesium can be reduced to extremely low levels, by raising the pH after co-separation to 10.5 followed by filtration.

We claim:

1. A method for removing calcium ions and silicon compounds from a liquor in an alkali metal chlorate process, comprising the sequential steps of (a) adding carbonate ions to the liquor for precipitating calcium carbonate; (b) adding an iron-containing compound to the liquor from step (a) for forming and precipitating a complex of iron ions and a silicon compound; and (c) thereafter co-separating the complex of iron ions precipitate, the silicon compound precipitate, and the calcium carbonate precipitate and thereby forming a purified liquor.

2. A method according to claim 1, wherein the liquor is an electrolyte.

3. A method according to claim 15, wherein a pH of the liquor is adjusted to become alkaline, before addition of carbonate ions.

4. A method according to claim 1, wherein a scrubber liquor from a hydrogen or reactor gas scrubber of a chlorate plant is used as a source of carbonate ions.

5. A method according to claim 1, wherein a molar ratio between the added iron-containing compound and silicon compounds in the liquor lies in a range of from about 1:1 up to about 20:1 calculated as Fe:Si.

6. A method according to claim 1, wherein the iron-containing compound comprises a compound with two or three valent iron ions or any mixture or sequence of addition thereof.

7. A method according to claim 1, wherein a pH of the liquor is adjusted to become alkaline in the co-separation step.

8. A method according to claim 7, wherein a pH of the liquor is adjusted to within a range of from 8 up to 11 in the co-separation step.

9. A method according to claim 1, wherein said method further includes precipitating magnesium hydroxide by adjusting a pH of the liquor to within a range of from about 9.5 up to about 13.5 after the precipitation of calcium carbonate and formation and the precipitation of the complex of iron ions and the silicon compound.

10. A method according to claim 9, wherein a pH of the liquor is adjusted after step (c).

11. A method according to claim 1, wherein the purified liquor from step (c) contains cationic impurities, and is ion exchanged for reducing said content of cationic impurities.

12. A method according to claim 1, wherein the liquor is a regeneration or conversion liquid from an ion-exchange step, or a mixture thereof.

13. A method according to claim 1, wherein a pH of the purified liquor from step (c) is adjusted to below about 6.5, for reducing any excess of carbonate ions by liberation of carbon dioxide.

14. A method according to claim 1, wherein the alkali metal chlorate is sodium chlorate.

15. A method according to claim 1, wherein a calcium-containing compound is added to the liquor before the addition of carbonate ions, for removing sulfate ions by precipitation of calcium sulfate.

* * * * *